(12) United States Patent
Kawasaki

(10) Patent No.: US 8,731,561 B2
(45) Date of Patent: May 20, 2014

(54) AREA DETECTION APPARATUS, AREA DETECTION METHOD AND AREA DETECTION RECORDING MEDIUM

(71) Applicant: Fujitsu Limited, Kawasaki (JP)

(72) Inventor: Takeshi Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/670,639

(22) Filed: Nov. 7, 2012

(65) Prior Publication Data
US 2013/0115950 A1    May 9, 2013

(30) Foreign Application Priority Data

Nov. 9, 2011 (JP) .................................. 2011-245777

(51) Int. Cl.
*H04W 36/00* (2009.01)
(52) U.S. Cl.
USPC ........................................ 455/436; 370/331
(58) Field of Classification Search
USPC .......................................... 370/331; 455/436
See application file for complete search history.

(56) References Cited

U.S. PATENT DOCUMENTS

2010/0267378 A1   10/2010  Hamabe et al.

FOREIGN PATENT DOCUMENTS

| JP | 2011-44808 | 3/2011 |
| WO | 2009/060935 | 5/2009 |

*Primary Examiner* — Charles Shedrick
(74) *Attorney, Agent, or Firm* — Katten Muchin Rosenman LLP

(57) ABSTRACT

An area detection apparatus includes an acquirer configured to acquire received power values in a plurality of areas from neighboring base stations, an identifier configured to identify an area including a handover point for a mobile station on the basis of the received power values, a calculator configured to calculate communication qualities of the neighboring base stations in the area including the handover point, and a determiner configured to determine whether or not the area including the handover point is an area incapable of communication with the neighboring base stations with a predetermined communication quality on the basis of the communication qualities of the neighboring base stations.

5 Claims, 5 Drawing Sheets

AREA DETECTION APPARATUS, AREA DETECTION METHOD AND AREA DETECTION RECORDING MEDIUM

CROSS-REFERENCE TO RELATED APPLICATION

This application is based upon and claims the benefit of priority of the prior Japanese Patent Application No. 2011-245777, filed on Nov. 9, 2011, the entire contents of which are incorporated herein by reference.

FIELD

The embodiment discussed herein is related to an area detection apparatus, an area detection method, and an area detection recording medium.

BACKGROUND

To date, in a wireless communication system, a mobile station has been performing communication with a base station that forms a cell in which the mobile station exists. The mobile station changes a base station to another base station while moving in accordance with the position thereof. However, at the time of design and displacement of a base station, depending on transmission power and direction of an antenna, there may arise an area (hereinafter referred to as a "coverage hole") in which communication quality of any base station does not reach a value that is allowed to communicate with the mobile station. In order to detect a coverage hole, for example, a method described below is employed. First, a designer of a base station divides an area to be determined whether there is a coverage hole or not into a plurality of grids (sub-areas), and sets up one evaluation point in each of these grids. Next, the designer measures communication qualities of neighboring base stations at each of the evaluation points. If none of the communication qualities of the neighboring base stations satisfy a demanded condition, a grid in which the evaluation point exists is determined to be a coverage hole.

However, if a determination target area of the coverage hole expands to a wide area, or if an area of a grid (granularity) is made small in order to increase detection precision, the designer arranges a lot of evaluation points. As a result, there is a problem in that the number of evaluation points at which communication qualities of the base stations increases, and an amount of calculation of CINR (Carrier to Interference and Noise Ratio) values that has to be performed for coverage hole detection increases. Such a problem becomes obvious in the case where a lot of neighboring base stations are located in the vicinity of an evaluation point. In particular, numbers of microcells and femtocells increase in recent years, thus a cell size of a base station is reduced, and thereby a coverage hole is reduced in size. Accordingly, in order for a designer to increase detection precision, the designer has to make the grid small, and to set up a larger number of the evaluation points. The above-described amount of calculation further increases in accordance with this.

Related-art techniques have been disclosed in International Publication Pamphlet No. WO 2009/060935, and Japanese Laid-open Patent Publication No. 2011-44808.

SUMMARY

According to an aspect of the invention, an apparatus includes an acquirer configured to acquire received power values in a plurality of areas from neighboring base stations; an identifier configured to identify an area including a handover point for a mobile station on the basis of the received power values; a calculator configured to calculate communication qualities of the neighboring base stations in the area including the handover point; and a determiner configured to determine whether or not the area including the handover point is an area incapable of communication with the neighboring base stations with a predetermined communication quality on the basis of the communication qualities of the neighboring base stations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the following, a detailed description will be given of an area detection apparatus, an area detection method, and an area detection program according to an embodiment of the present disclosure with reference to the drawings. In this regard, the present disclosure is not limited to an area detection apparatus, an area detection method, and an area detection program according to the embodiment.

Figure 1:
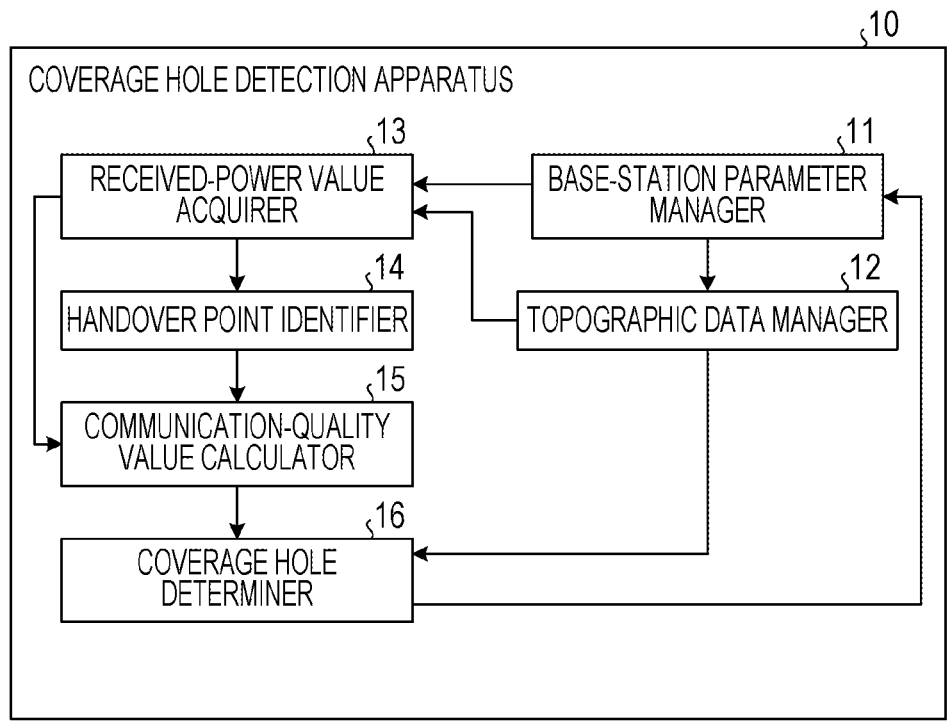
FIG. 1 is a diagram illustrating a functional configuration of a coverage hole detection apparatus according to the present embodiment.

First, a description will be given of a configuration of a coverage hole detection apparatus according to the present embodiment. FIG. 1 is a diagram illustrating a functional configuration of a coverage hole detection apparatus 10 according to the present embodiment. The coverage hole detection apparatus 10 includes a base-station parameter manager 11, a topographic data manager 12, a received-power value acquirer 13, a handover point identifier 14, a communication-quality value calculator 15, and a coverage hole determiner 16. These individual component parts are connected so as to make it possible to input and output a signal and data unidirectionally or bi-directionally.

The base-station parameter manager 11 stores, in an updatable manner, transmission power from a base station, inclinations of an antenna in the vertical direction and the horizontal direction (tilt and azimuth), or a location (latitude and longitude) of a base station as parameters (hereinafter referred to as "station parameters") of a base station located in an area that becomes a target of coverage hole detection. The topographic data manager 12 stores utilization of lands, altitude of earth's surface and form of ups and downs, types of landform, maps, etc., in an updatable manner as topographic data of an area to be a target of coverage hole detection.

The received-power value acquirer 13 obtains a received-power value from each base station in each grid using a station parameter obtained from the base-station parameter manager 11 and topographic data obtained from the topographic data manager 12. The handover point identifier 14 identifies a point at which the mobile station performs handover in each of the above-described grids (hereinafter referred to as a "handover point") on the basis of the received-power value inputted from the received-power value acquirer 13.

The communication-quality value calculator 15 calculates communication qualities of a serving base station (for example, a base station of a handover source) and a target base station (for example, a base station of a handover destination) at the handover point identified by the handover point identifier 14 using the received-power values that are inputted from the received-power value acquirer 13. Also, if none of the communication qualities of the serving base station and the target base station satisfy a predetermined condition, the communication-quality value calculator 15 calculates communication qualities of the other base stations (for example, base stations other than the serving base station and the target base station) in the grid of the handover point. For the communication quality, for example, the above-described CINR is used, but an SINR (Signal to Interference and Noise Ratio), a CIR (Carrier to Interference Ratio), SIR (Signal to Interference Ratio), etc., may be used.

The coverage hole determiner 16 determines whether communication between the mobile station and each of neighboring base stations is possible or not on the basis of the communication quality value of each of the neighboring base stations that was inputted from the communication-quality value calculator 15. If none of the neighboring base stations do not satisfy a predetermined communication quality, the coverage hole determiner 16 determines a grid to which the point belongs to be a coverage hole. Further, the coverage hole determiner 16 adds weight to each grid on the basis of a number of users estimated from the topographic data inputted from the topographic data manager 12, and calculates a sum total of weights of the grids determined to be a coverage hole. The coverage hole determiner 16 changes a station parameter in the base-station parameter manager 11 such that the sum total of the weights becomes a small value as much as possible (feedback control), and outputs the station parameter that makes the sum total of the coverage holes minimum as an optimum parameter to the base-station parameter manager 11.

Figure 2:
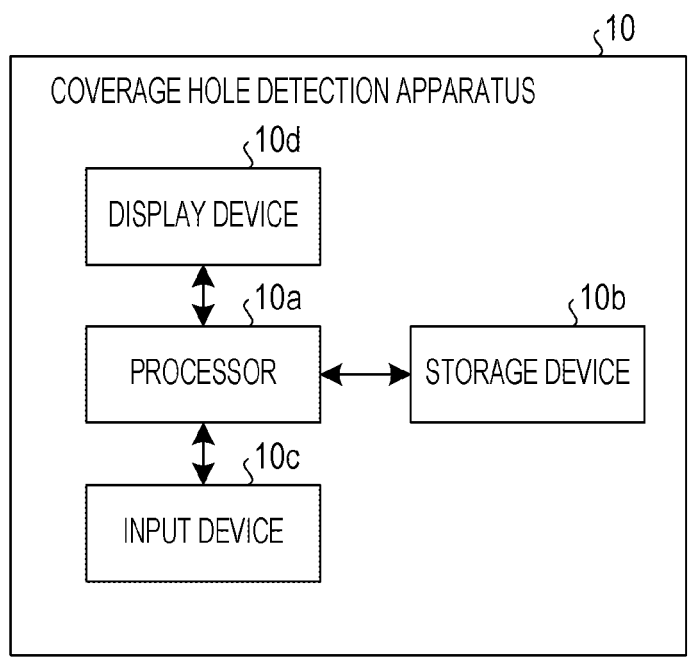
FIG. 2 is a diagram illustrating a hardware configuration of the coverage hole detection apparatus according to the present embodiment.

Next, a description will be given of a hardware configuration of the coverage hole detection apparatus 10. FIG. 2 is a diagram illustrating the hardware configuration of the coverage hole detection apparatus 10. As illustrated in FIG. 2, in the coverage hole detection apparatus 10, a processor 10a, a storage device 10b, an input device 10c, and a display device 10d are connected through a bus so as to make it possible to input and output various signals and data. The processor 10a is, for example, a CPU (Central Processing Unit) and a DSP (Digital Signal Processor). The storage device 10b includes, for example, a RAM, such as an SDRAM (Synchronous Dynamic Random Access Memory), etc., in addition to a nonvolatile storage device, such as an HD (Hard Disk), a ROM (Read Only Memory), a flash memory, etc. Also, the input device 10c includes, for example, a keyboard, a mouse, and a touch panel, and the display device 10d includes, for example, an LCD (Liquid Crystal Display) and an ELD (Electro Luminescence Display).

The base-station parameter manager 11 and the topographic data manager 12 in the coverage hole detection apparatus 10 illustrated in FIG. 1 are achieved by the storage device 10b as hardware. Also, the received-power value acquirer 13, the handover point identifier 14, the communication-quality value calculator 15, and the coverage hole determiner 16 are achieved by the processor 10a as hardware.

Figure 3:
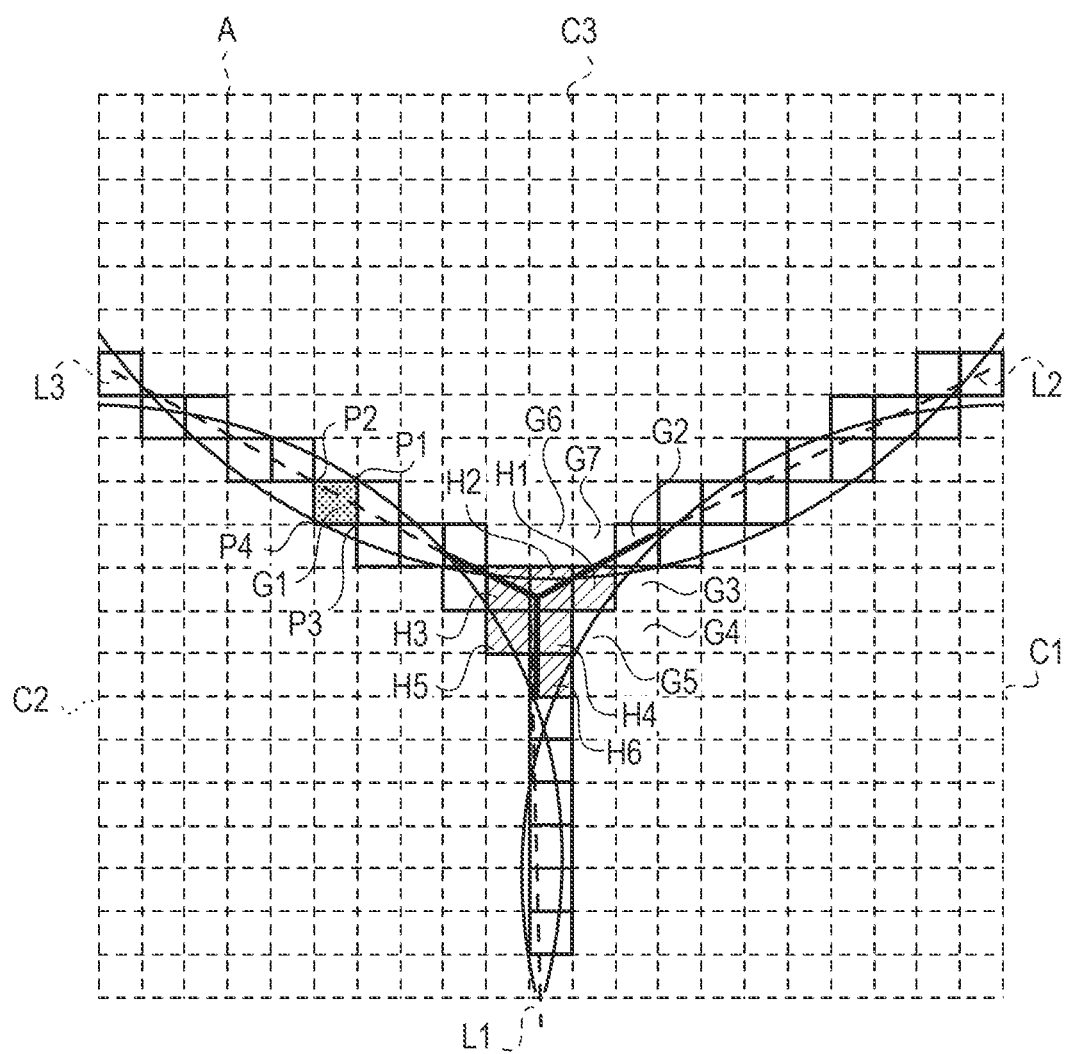
FIG. 3 is a diagram for explaining a process for detecting a coverage hole for each grid by the coverage hole detection apparatus according to the present embodiment.

Next, a description will be given of operation of the coverage hole detection apparatus 10 with reference to FIG. 3 and FIG. 4. FIG. 3 is a diagram for explaining a process in which a coverage hole detection apparatus 10 according to the present embodiment detects coverage holes H1 to H6 for individual grids. In the operation description, it is assumed that an area A in the vicinity of boundaries of cells C1 to C3 formed by base stations B1 to B3 are target areas (evaluation areas) of coverage hole detection. As illustrated in FIG. 3, the area A is divided into a large number of grids. A grid is substantially square in shape, and a length of one side of the grid is about five meters in the case of outdoors, and about one meter in the case of indoors, for example.

Figure 4:
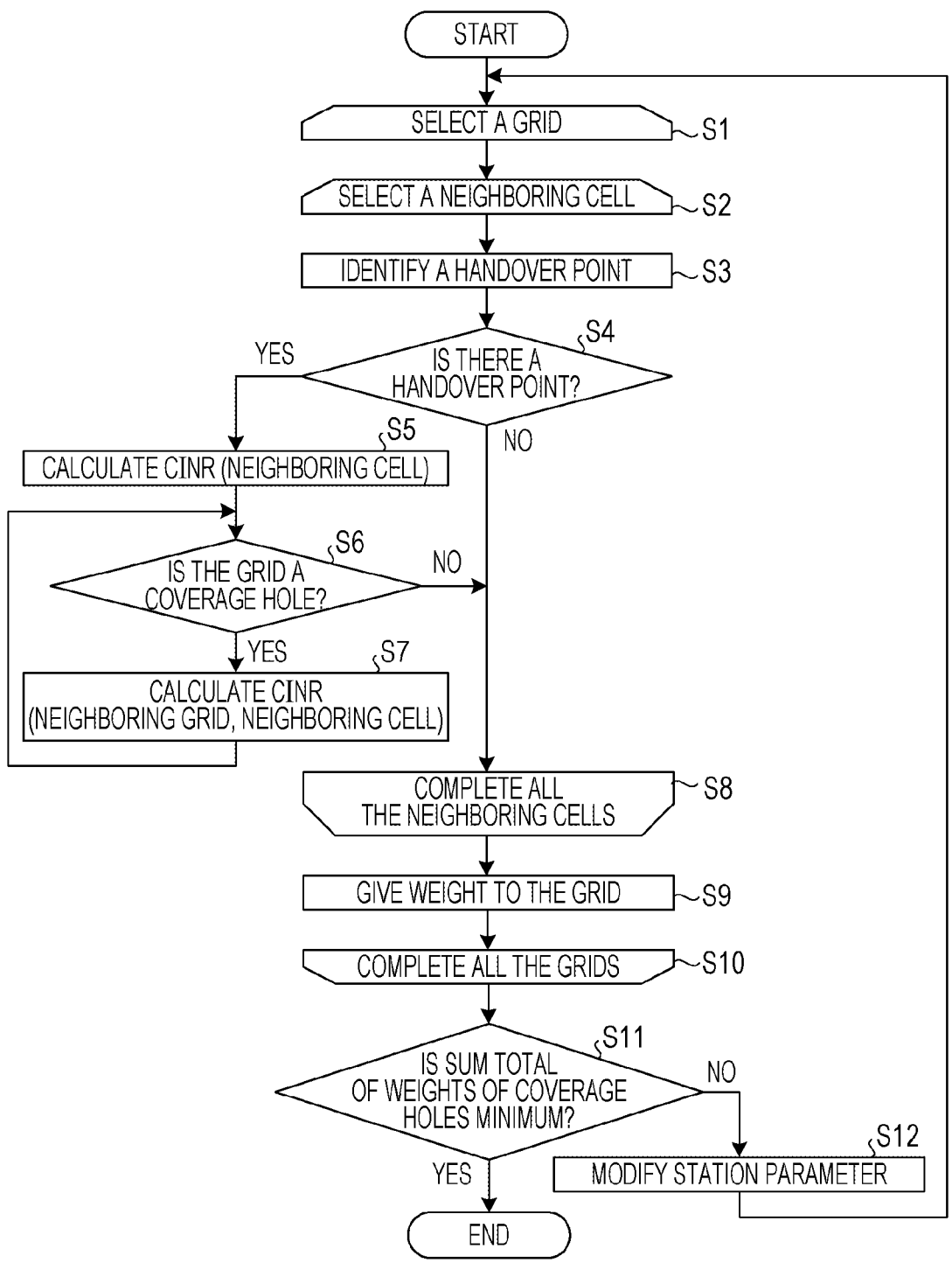
FIG. 4 is a flowchart for explaining operation of the coverage hole detection apparatus according to the present embodiment.

FIG. 4 is a flowchart for explaining operation of the coverage hole detection apparatus 10 according to the present embodiment. In S1, the processor 10a selects a grid to be a target of coverage hole determination from the area A. The processor 10a may select a grid sequentially from an end of the area A in a vertical direction or in a lateral direction, or may select any grid in accordance with an instruction from the input device 10c. In S2, the processor 10a selects a neighboring cell to be a calculation target of a received-power value from neighboring cells C1 to C3. The neighboring cells are selected in order of a serving base station cell, a target base station cell, and a neighboring cell other than these. For example, in FIG. 3, if it is assumed that a mobile station performs handover from the cell C2 to the cell C1, the processor 10a first selects the cell C2 with priority as a neighboring cell, next, selects the cell C1 of the handover destination, and then selects cell the C3, which is a neighboring cell other than the cells C1 and C2.

In S3, the processor 10a identifies a handover point of the mobile station on the basis of received power value from the individual neighboring base stations B1 to B3 that form the cells C1 to C3. That is to say, the processor 10a calculates received-power values at four corners of the grid selected in S1 for each of the neighboring base stations B1 to B3, and identifies a point having reversed received-power values among neighboring base stations (the difference becomes 0) as a handover point. For example, if a grid G1 is selected in S1, four points at the corners of the grid G1 illustrated by half-tone dot meshing in FIG. 3 are selected as received power measurement points P1 to P4. If neighboring base stations having a maximum received-power value at the received power measurement points P1 to P4 are the same, reversion of received-power values does not occur at the grid G1, and thus the grid G1 is not identifies as a grid including a handover point. On the other hand, if the neighboring base stations having a maximum received-power value at the received power measurement points P1 to P4 in the grid G1 are different, for example, if that base station is the base station B3 (the cell C3) at the measurement points P1 and P2, and that base station is the base station B2 (the cell C2) at the measurement points P3 and P4, it is possible to estimate that reversion of the received-power values occurs in the grid G1. Accordingly, in such a case, the processor 10a identifies the grid G1 to be a grid including a handover point.

In this regard, in S3, as a method of the processor 10 for identifying a grid to be a handover point, received power (RSRP: Reference Signal Received Power) values are used. However, the present disclosure is not limited to this, and the processor 10a may identify a point at which propagation losses are reversed between the individual neighboring base stations B1 to B3 and the mobile station as a handover point. Also, the processor 10a may identify a point at which amounts of delay are reversed between the individual neighboring base stations B1 to B3 and the mobile station as a handover point using timing information, such as TA (Timing Advance), etc.

In S5, as a result of the processing in the above-described S3, if it is determined that there is a handover point in the grid selected in S1 (S4; Yes), the processor 10a calculates a CINR value in the above-described grid of the neighboring cells selected in S2. Next, the processor 10a determines whether the grid selected in S1 is a coverage hole or not using the CINR value calculated in S5 (S6). For example, on the basis of whether the CINR values of both of the serving base station B2 and the target base station B1 are predetermined threshold value or more, first, the processor 10a determines whether or not these base stations satisfy a condition that allows communication with the mobile station at a determination of a coverage hole. As a result of the determination, if the CINR value of at least one of the base stations out of both of the base stations B1 and B2 is a predetermined threshold value or more, the processor 10a determines that the target grid is not a coverage hole (S6; No). On the other hand, if the CINR values of both of the base stations B1 and B2 are less than the predetermined threshold value, the processor 10a determines that RLF (Radio Link Failure) occurs, and makes the same determination on the remaining neighboring base stations B3 as that on both of the base stations B1 and B2. As a result of the determination, if the CINR values of all the neighboring base stations B1 to B3 are less than the predetermined threshold value, the processor 10a determines that none of these base stations B1 to B3 satisfy the condition for allowing communication with the mobile station. The processor 10a determines that the grid selected in S1 is a grid incapable of communication (coverage hole) (S6; Yes).

In S7, the processor 10a makes the same determination on neighboring grids of the grid that has been determined to be a coverage hole in S6 as the determination in S6. It is highly possible that there is a coverage hole in the vicinity of the coverage hole, and thus an omission of detecting a coverage hole is avoided. As a result, certainty of coverage hole detection by the coverage hole detection apparatus 10 is improved, and thus reliability is improved.

In this regard, on the grid including a handover point, the determination on the basis of the CINR value has been completed in S6, and thus in S7, that grid is excluded from a determination target of a coverage hole. For example, in FIG. 3, if a grid H1 (a shaded portion in FIG. 3) including a handover point L2 is determined to be a coverage hole, grids G2 to G7, H2, H4, which are neighboring grids thereof, become candidates of the coverage-hole determination target. However, among these grids, the grid G2 includes the handover point L2, and the grid H4 includes the handover point L1. Also, the grid H2 is a grid including the handover points L1, L2, and L3. Accordingly, among eight grids located in surroundings of the grid H1, the grids G2, H4, and H2 are excluded from a determination target of a coverage hole, and as a result, only the remaining five grids G3 to G7 are selected as determination targets.

In S4, if determined that there is no handover point in the grid selected in S1 (S4; No), or as a result of the determination in S6, if determined that the grid selected in S1 is not a coverage hole (S6; No), processing of S8 and thereafter is executed. That is to say, the processor 10a determines whether there are neighboring cells that have not been selected in the vicinity of the grid selected in S1 (for example, within a radius of one kilometer) or not. If there are the neighboring cells, the above-described processing in S3 and thereafter are executed on the remaining neighboring cells that have not been selected in S2 (S8). On the other hand, if all the neighboring cells have been selected, the processor 10a executes processing of S9 and thereafter.

In S9, the processor 10a adds a weight to the grid determined to be a coverage hole. For example, the processor 10a reads topographic data from the storage device 10b, refers to the topographic data, and predicts a number of users of the mobile station. Each grid is multiplied by a factor F, which is a large value when the number of users is large, and a small value when the number of users is small in accordance with the predicted number of users. Thereby, the processor 10a adds a weight to each grid in accordance with importance of the gird. That is to say, a grid including many users, to put it in another way, a grid that is predicted to cause harmful effects when the grid includes a coverage hole is weighted heavier than a grid having less disadvantage. Accordingly, it becomes possible to set station parameters that meet the actual situation in consideration of the topographic data compared with the case of equally handling all the grids that are determined to be coverage holes. As a result, flexibility of the coverage hole detection apparatus 10 and adaptability to the communication environment are improved.

A series of processing in the above-described S2 to S9 is executed for all the grids pertaining to the coverage-hole detection target area A. When selection of all the grid is completed (S10), the processor 10a executes processing of S11 and thereafter. That is to say, the processor 10a reads a plurality of candidates of the station parameters from the storage device 10b, and searches for a station parameter having a smallest sum total of weights of the grids determined to be a coverage hole from the candidates of the station parameters (S11). If the station parameter having the smallest sum total of the weights is determined (S11; Yes), the processor 10a outputs that station parameter to the display device 10d as an optimum value. On the other hand, if the station parameter having the smallest sum total of the weights is not determined, the processor 10a changes the previous station parameter to a new parameter (S12), and then executes a series of processing in the above-described S1 to S11 using the station parameter that has been set again. Thereby, the coverage hole detection apparatus 10 tries to search for the station parameter having a smallest value of the sum total of the weights of the coverage holes, and terminates the processing at a point in time when that station parameter is detected.

For example, in the area A in FIG. 3, the grids H1 to H6 indicated by slanting lines are detected as coverage holes. In this case, if weight values for the grids H1 to H6 are individually H1 to H3=0.3, H4=0.8, and H5 to H6=0.5, the sum total of the weights of the coverage hole becomes 2.3 (=0.3×3+ 0.4×1+0.5×2). However, there is a possibility that a group of grids that are different from the grids H1 to H6 is detected as a coverage hole in accordance with transmission power from the base stations, an inclination of the antenna, and positions of the base stations depending on another station parameter setting. In this case, the sum total of the weights of the coverage hole also changes. Accordingly, if the coverage hole detection apparatus 10 can identify a station parameter having the sum total of the weights, it becomes possible to design base stations such that a coverage hole gives a smallest impact on the users of the mobile stations.

As described above, the coverage hole detection apparatus 10 includes the received-power value acquirer 13, the handover point identifier 14, the communication-quality value calculator 15, and the coverage hole determiner 16. The received-power value acquirer 13 obtains received power (for example, RSRP) values from the neighboring base stations B1 to B3 in a plurality of areas (for example, grids). The handover point identifier 14 identifies a handover point of a mobile station using the received power. The communication-quality value calculator 15 calculates communication qualities (for example, CINRs) of the neighboring base stations B1 to B3 in an area including the above-described handover point out of the plurality of areas. The coverage hole determiner 16 determines whether or not the area including the handover point is an area incapable of communication with the neighboring base stations B1 to B3 (for example, a coverage hole) with a predetermined communication quality (for example, 3 to 10 dB or more) using the communication qualities of the neighboring base stations B1 to B3.

In the coverage hole detection apparatus 10, the communication-quality value calculator 15 may calculate communication qualities of the (handover source and destination) base stations B2 and B1, which form a handover boundary of the mobile station, out of the neighboring base stations B1 to B3, and then may calculate the communication quality of the other neighboring base station B3. Also, in the coverage hole detection apparatus 10, the communication-quality value calculator 15 calculates the communication qualities of the neighboring base stations B1 to B3 in the neighboring areas determined to be areas incapable of the communication by the coverage hole determiner 16. Further, the coverage hole determiner 16 may determine whether the neighboring areas are areas incapable of the communication or not using the communication qualities of the neighboring base stations B1 to B3.

That is to say, in order for the designer to minimize the number of coverage holes at a design phase of base stations, detection of a coverage hole has to be repeated a plurality of times while changing the station parameters. Accordingly, the amount of calculation for detection of a coverage hole is significantly influenced by the number of the grids of the determination targets of coverage holes. As the number of grids to be determination targets increases, the amount of calculation increases. To put it in another way, the coverage hole detection apparatus 10 narrows down the grids of the determination targets so that it becomes possible to drastically reduce amount of calculation in order to determine the station parameters for minimizing the number of coverage holes.

Thus, the coverage hole detection apparatus 10 according to the present embodiment selects, first, grids of the boundary points of the cells that satisfy a handover condition using the fact that a coverage hole exists in the vicinity of the cells C1 to C3 of the individual base stations B1 to B3. Next, the coverage hole detection apparatus 10 calculates communication qualities of the serving base station and the target base station whose communication qualities are estimated to be relatively favorable only on these grids, and compares with demanded communication qualities. Only if none of the communication qualities satisfy the demanded qualities, the coverage hole detection apparatus 10 calculates the communication qualities of all the neighboring base stations, and compares with the demanded communication qualities. As a result, a grid whose all the neighboring base stations do not satisfy a predetermined demanded quality is determined to be a coverage hole. Moreover, the coverage hole detection apparatus 10 minimizes the number of coverage holes by repeatedly adjusting the station parameters so as to reduce the number of grids that are determined to be coverage holes in the design of a base station.

As described above, by the coverage hole detection apparatus 10 according to the present embodiment, the number of points at which communication qualities are obtained is reduced compared with before, and it becomes possible to reduce an overall amount of calculation. In particular, the calculation of the communication quality (dB value) involves a conversion from a logarithm to a real number and a reconversion from a real number to a logarithm, and thus the conversion is more complicated than calculation of a received-power, which can be calculated independently for each value base station, and occupies a major portion of the calculation processing for determining the station parameter. Accordingly, the reduction in the amount of calculation of the communication quality greatly contributes to the reduction in the amount of calculation by the coverage hole detection apparatus 10.

Figure 5:
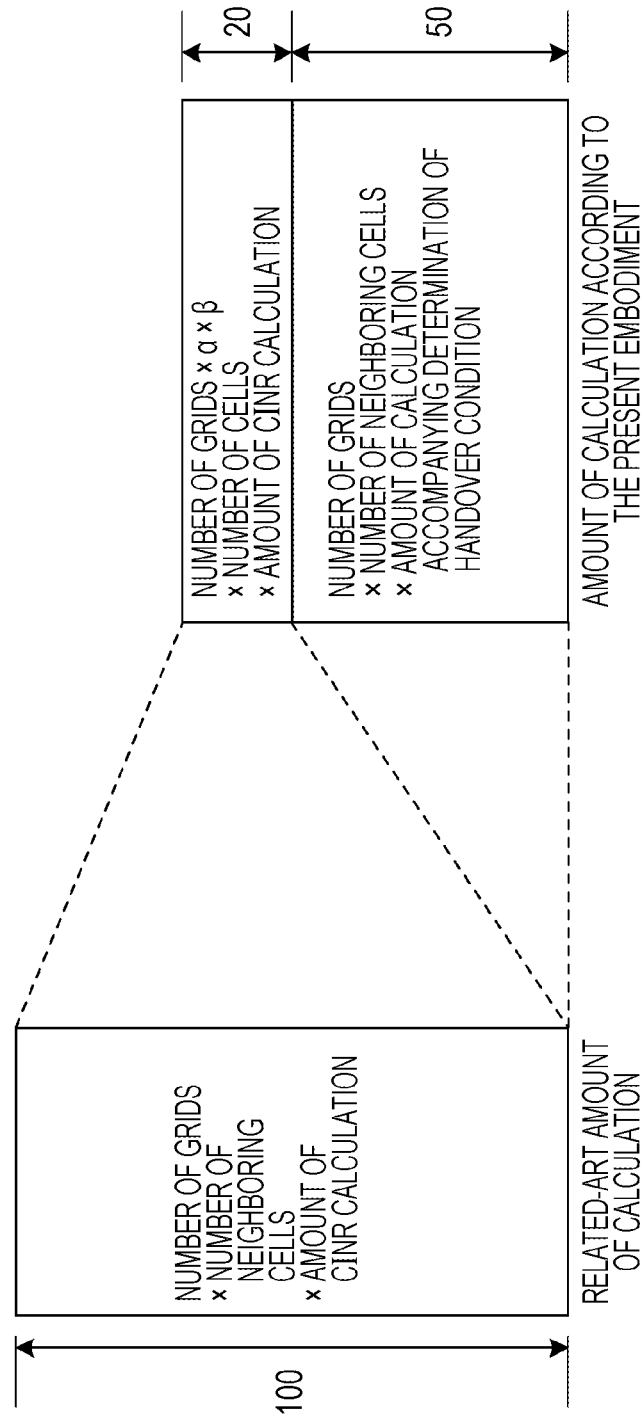
FIG. 5 is a diagram illustrating comparative examples of amounts of calculation accompanying coverage hole detection.

FIG. 5 is a diagram illustrating comparative examples of amounts of calculation accompanied with coverage hole detection. As illustrated in FIG. 5, if it is assumed that a related-art amount of calculation is 100, an amount of calculation of the coverage hole detection apparatus 10 according to the present embodiment is reduced to about 70. In FIG. 5, $\alpha$ indicates a probability of existence of a handover points (L1 to L3 in FIG. 3) in the individual grids, and $\alpha$ satisfies $0<\alpha<1$. Of eight neighboring grids of each grid, $\beta$ indicates a number of grids that do not include handover points (L1 to L3 in FIG. 3), and $\beta$ satisfies $1 \leq \beta \leq 8$. The related-art amount of calculation is calculated as a product of the number of grids, the number of neighboring cells (for example, 5 or 6 pieces), and CINR amount of calculation, and this value is assumed to be 100. The amount of calculation increases in proportion to the number of grids and the number of neighboring cells. However, in the amount of calculation according to the present embodiment, by the multiplication of $\alpha$ that satisfies $0<\alpha<1$, the amount of calculation drastically decreases (for example, 20). However, in the present embodiment, since a determination based on handover conditions (narrow down the grids) has to be performed, an amount of calculation (for example, 50) accompanying this is added. However, the determination based on handover conditions has only to perform additions and subtractions unlike the CINR calculation including logarithm calculation. Thus, even in consideration of an increase in the amount of calculation for the determination, the amount of calculation of the coverage hole detection apparatus 10 decreases in total.

More specifically, in a method of analyzing existence of a coverage hole in a design phase of a wireless base station, the coverage hole detection apparatus 10 derives a boundary point among the base stations B1, B2 and B3, which satisfies a handover condition. If none of the communication qualities of all the neighboring base stations including the base stations B1 to B3 in the boundary point satisfy the demanded condition, the coverage hole detection apparatus 10 identifies a grid pertaining to the boundary point to be a coverage hole. The coverage hole detection apparatus 10 narrows down areas on which communication quality evaluation of neighboring base stations is performed for coverage hole detection using a characteristic that a coverage hole is possibly located in a cell boundary, so that the amount of calculation is reduced. To put it in another way, the grids whose communication quality values are calculated are limited to the grids in the vicinity of the handover boundary having a high probability of existence of a coverage hole, and thus the amount of calculation for identifying a coverage hole is reduced.

Also, the coverage hole detection apparatus 10 limits the case of determining whether or not communication qualities of neighboring base stations in each boundary point satisfy the demanded condition to the case where the communication qualities of the serving base station and the target base station referenced as a handover condition do not satisfy the demanded condition. The coverage hole detection apparatus 10 performs quality evaluation of the serving base station and the target base station having a high possibility of becoming a coverage (having a low possibility of becoming incapable of communication with a predetermined communication quality) prior to quality evaluation of all the neighboring base stations. That is to say, the coverage hole detection apparatus 10 first calculates the communication quality values on the serving base station and the target base station with priority out of the neighboring base stations on a grid including a handover point. After that, the coverage hole detection apparatus 10 calculates communication quality values on the neighboring base stations other than these base stations. Among the neighboring base stations, if the communication quality value of even one base station satisfies the demanded condition, a grid whose communication quality value has been calculated is determined not to be a coverage hole at the point in time. Thus, the coverage hole detection apparatus 10 does not have to calculate communication quality values of the neighboring base stations other than the above-described base stations after that. Accordingly, it is possible for the coverage hole detection apparatus 10 to reduce the number of base stations on which quality evaluation is to be performed before a grid of the determination target is determined not to be a coverage hole. As a result, it is possible to achieve an efficient determination of whether there is a coverage hole or not with a reduced amount of calculation of the communication qualities.

Further, the coverage hole detection apparatus 10 determines whether or not neighboring grids of the grid identified as a coverage hole have communication qualities of the neighboring base stations that satisfy the demanded condition so as to identify a coverage hole. There is a high possibility that another coverage hole further exists in the surrounding area of a coverage hole. Accordingly, the coverage hole detection apparatus 10 selects grids adjacent to the grid determined to be a coverage hole as evaluation target of the communication qualities so that it is possible to detect a coverage hole without omission. At this time, the coverage hole detection apparatus 10 excludes a grid including a handover point from an evaluation target of communication quality, so that reevaluation of the grid that has been once evaluated is avoided before it actually happens, and thus duplicate calculation of the communication quality values is avoided. Thereby, it becomes possible to more efficiently detect a coverage hole.

In particular, if a comparison between the detected coverage hole and the topographic data stored in the topographic data manager 12 reveals that the coverage hole is in a grid where a user normally does not exist, or a user very rarely exists, the coverage hole detection apparatus 10 may not assume the grid to be a coverage hole. Thereby, the coverage hole detection apparatus 10 excludes a coverage hole located at a position having few users so that a negative impact given on selection of station parameters by existence of a negligible coverage hole is substantially excluded. In this regard, it is possible to achieve processing that does not recognize (disregards), as a coverage hole, a grid detected by the coverage hole detection apparatus 10 to be a coverage hole by the coverage hole determiner 16 setting "0" to the weight to that grid.

Also, in the coverage hole detection apparatus 10, the coverage hole determiner 16 changes station parameters so as to reduce the detected coverage holes, and thus estimates a station parameter capable of minimizing the coverage holes. As a result of the estimation, the coverage hole detection apparatus 10 adopts a parameter having a minimum number of coverage holes as a minimum parameter in designing the base station. Thereby, even in the case where it is not allowed to get rid of coverage holes completely, it is possible for the coverage hole detection apparatus 10 to restrain adverse impacts caused by existence of a coverage hole (communication incapability and communication disconnection) as much as possible. At this time, the coverage hole detection apparatus 10 gives a weight to each coverage hole in accordance with the number of users by comparison with the topographic data, and adopts a station parameter having a minimum value of the sum total of the weights as an optimum parameter. Thereby, a parameter that results in fewest users of a coverage hole is set as an optimum parameter. Accordingly, it is possible for the coverage hole detection apparatus 10 to minimize impacts of a coverage hole on users. As a result, the above-described adverse impact caused by existence of a coverage hole is further restrained.

Coverage Hole Detection Program

Figure 6:
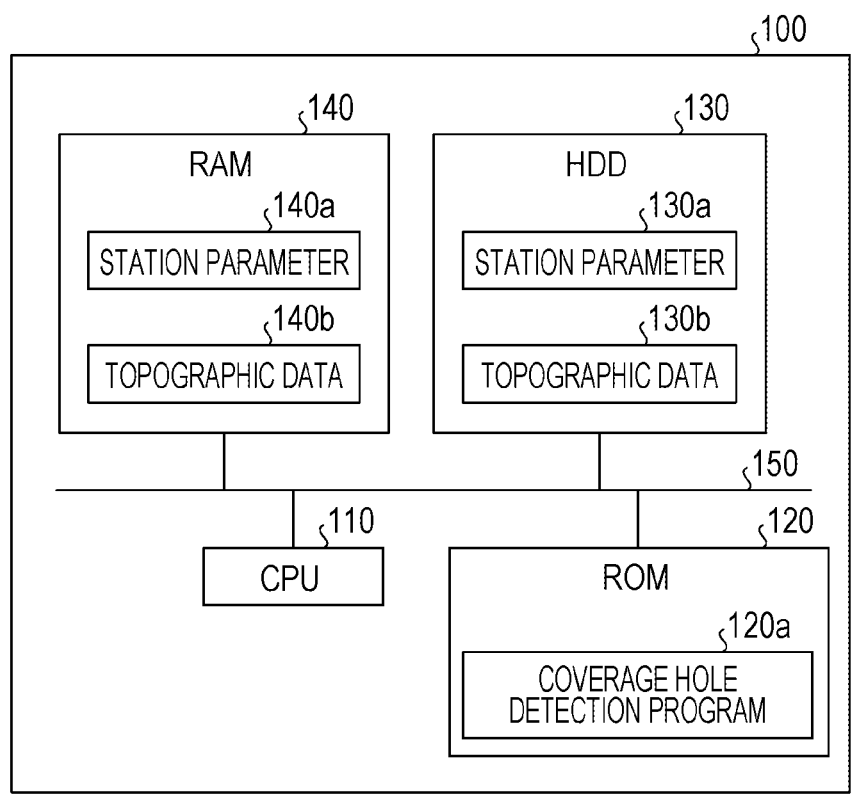
FIG. 6 is a diagram illustrating a computer on which a coverage hole detection program is executed.

It is possible to achieve the various kinds of processing of the coverage hole detection apparatus 10 described in the above-described embodiment by executing a program provided in advance on a computer system, such as a personal computer, a workstation, etc. Thus, in the following, a description will be given of an example of a computer that executes a coverage hole detection program having same functions as the coverage hole detection apparatus 10 described in the above-described embodiment using FIG. 6. FIG. 6 is a diagram illustrating a computer on which a coverage hole detection program is executed.

As illustrated in FIG. 6, a computer 100 according to the embodiment includes a CPU (Central Processing Unit) 110, a ROM (Read Only Memory) 120, an HDD (Hard Disk Drive) 130, and a RAM (Random Access Memory) 140. The individual parts 100 to 140 are connected through a bus 150.

The ROM 120 stores, in advance, a coverage detection program that performs same functions as those of the received-power value acquirer 13, the handover point identifier 14, the communication-quality value calculator 15, and the coverage hole determiner 16, illustrated in the embodiment. That is to say, as illustrated in FIG. 6, the ROM 120 stores the coverage hole detection program 120a. In this regard, the coverage hole detection program 120a may be suitably divided. The CPU 110 reads the coverage hole detection program 120a from the ROM 120, and executes the program.

The HDD 130 stores the above-described station parameter 130a and topographic data 130b. The CPU 110 reads the station parameter 130a and the topographic data 130b. The CPU 110 stores these in the RAM 140. The CPU 110 executes the coverage hole detection program 120a using the station parameter 140a and the topographic data 140b stored in the RAM 140. Also, the CPU 110 executes the coverage hole detection program 120a using the station parameter 130a and the topographic data 130b stored in the HDD 130. In this regard, all of the individual data (the station parameter 140a and the topographic data 140b) stored in the RAM 140 does not have to be stored in the RAM 140 all the time, and only data to be used for the processing ought to be temporarily stored in the RAM 140.

In this regard, the coverage hole detection program 120*a* does not have to be stored in the HDD 130 from the beginning. For example, the computer 100 stores the program in a "portable physical medium", such as a flexible disk (FD), a CD-ROM, a DVD disc, a magneto-optical disc, an IC card, etc., which are inserted into the computer 100. The computer 100 may read the program from these media, and execute the program. Further, the program may be stored in "another computer (or a server)", etc., that is connected to the computer 100 through a public network, the Internet, a LAN, a WAN, etc.

In this regard, in the above-described embodiment, it is assumed that the coverage hole determiner 16 selects a station parameter that makes the sum total of the weights of the coverage holes minimum out of a plurality of station parameters. However, the present disclosure is not limited to such a mode, and a designer of a base station may select some combinations of the station parameters that can be operated in advance (for example, 3 to 10 pieces), and the coverage hole determiner 16 may calculate the sum total of the coverage holes only on the selected combinations. In such a mode, the coverage hole determiner 16 selects a combination that makes the sum total of the weights of the coverage hole minimum from the combinations of the tried station parameters (transmission power from the base station, an inclination and direction of antenna, a position of the base station, etc.,) as an optimum value. Thereby, only station parameters that can be used for actual operation become candidates, and thus the amount of the calculation of the sum total of the weights is reduced compared with the above-described embodiment in which the coverage hole determiner 16 searches for a station parameter that makes the sum total of the weights minimum, and selects the station parameter. Accordingly, it is possible for the coverage hole detection apparatus 10 to further reduce the amount of calculation for detecting a coverage hole. As a result, processing load and processing time of the coverage hole detection apparatus 10 are reduced, and it becomes possible to promote efficiency of coverage hole detection.

Also, in the above-described embodiment, for convenience of description, the neighboring base stations whose communication quality values are to be calculated by the coverage hole detection apparatus 10 in order to determine a coverage hole are assumed to be three base stations B1 to B3. However, the present disclosure have not to be this. For example, the coverage hole detection apparatus 10 may calculate communication quality values on all the base stations that exist in a predetermined distance from a mobile station or a certain number of base stations (for example, 5 to 7 base stations) having a short distance from the mobile station, and may determine whether a coverage hole or not. Also, the coverage hole detection apparatus 10 may calculate communication quality values on all the base stations from which the mobile station has a received-power value of a predetermined value or more using the received-power value obtained by the received-power value acquirer 13. Thereby, it is possible for the coverage hole detection apparatus 10 to select a candidate of the base stations capable of communicating with the mobile station as a calculation target of the communication quality value without omission. As a result, detection precision of a coverage hole is improved.

Further, in the above-described embodiment, it is assumed that the coverage hole detection apparatus 10 calculates received-power values using all the grids pertaining to a detection target area of a coverage hole as candidates of a handover point in order to identify a handover point. However, the received-power value acquirer 13 may exclude grids in the vicinity of centers of the cells C1 to C3 having a low probability of becoming a handover point from the candidates of handover points, and may regard only the grids near the boundaries of the individual cells C1 to C3 as calculation targets of the received-power values. Thereby, the calculation targets of the received-power values are reduced. Accordingly, the amount of calculation accompanying the determination of a handover condition is decreased. As a result, it becomes possible for the coverage hole detection apparatus 10 to further reduce the amount of calculation at coverage hole detection.

Also, in the above-described embodiment, it is assumed that the received-power value is measured by extracting four corner points from the individual grids on the measurement of the received-power value. However, the number of measurement points and positions are not limited to this, and are possible to be suitably changed in accordance with communication environment, such as a received radio-wave state, intensity of interference, existence of a shield and reflector, etc. About the calculation of a communication quality value, the processor 10*a* of the coverage hole detection apparatus 10 may dispose one representative point in each grid, and may calculate a communication quality value at the representative point. Alternatively, the processor 10*a* may set a plurality of calculation points at predetermined positions in each grid, and may adopt a communication quality value having a maximum value or a minimum value among a plurality of communication quality values calculated at the individual calculation points as a communication quality value of the grid.

Further, in the above-described embodiment, it is assumed that the received-power value and the communication quality value are measured or calculated for each grid. However, the processor 10*a* may put together a plurality of grids, and regard them as one grid depending on the communication environment, such as a landform of a grid, or a received radio-wave state, intensity of interference, existence of a shield and reflector, etc., and may measure a received-power value, or calculate a communication quality value on the grid. Thereby, it is possible for the coverage hole detection apparatus 10 to suitably change a size and a shape of a grid in accordance with a state of a landform at which a grid is located and the communication environment. Accordingly, it becomes possible to more flexibly set and dispose a grid. As a result, environmental adaptability of the coverage hole detection apparatus 10 is improved.

Also, in the above-described embodiment, the processor 10*a* determines whether or not to be a target of the calculation of a communication quality value on the basis of existence or absence of a handover point. That is to say, a grid including at least one handover point is subjected to calculation of the communication quality value regardless of the number of handover points. However, the present disclosure is not limited to such a mode. The processor 10*a* may determine only a grid including a plurality of handover boundaries that are a set of handover points to be a calculation target of the communication quality value. For example, if two is set to a threshold value of the number of handover boundaries, in FIG. 3, the grids G2 and G7 include a handover boundary L2, but do not include the other handover boundaries L1 and L3. Accordingly, the number of handover boundaries included in the grids G2 and G7 is 1, and thus this does not satisfy the above-described threshold value. Accordingly, the grids G2 and G7 do not become the calculation targets of the communication quality values. For the same reason, grids H1, H3, H4 and H6 are also excluded from the calculation targets of the communication quality values. On the other hand, the grid H2 is a grid including handover boundaries L1, L2 and L3, and thus the number of handover boundaries is three, which is not less than the above-described threshold value. Accordingly, the grid H2 is selected as a grid of the calculation target of the communication quality value. By such a mode, the amount of calculation accompanying coverage hole detection is further decreased.

The individual components of the coverage hole detection apparatus 10 do not have to be configured physically as illustrated in the figures. That is to say, specific modes of distribution and integration of the individual devices are not limited to those illustrated in the figure. It is possible to configure all of the devices or a part of the devices by functionally or physically distributing and integrating for any unit of the devices in accordance with various loads and use states, etc. For example, the received-power value acquirer 13 and the communication-quality value calculator 15, or the base-station parameter manager 11 and the topographic data manager 12 may be integrated as one component, respectively. On the contrary, the coverage hole determiner 16 may be divided into a part that actually determines whether each grid is a coverage hole or not, and a part that determines an optimum station parameter by weighting each grid. Further, the storage device 10b may be connected through a network or a cable as an external device of the coverage hole detection apparatus 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An area detection apparatus comprising:
   a storage configured to store received power values from neighboring base stations; and
   a processor configured to:
   form a plurality of grids in an area overlapping neighboring cells;
   iteratively select each of the plurality of grids, acquire the received power values in the selected grid from one or more of the neighboring base stations corresponding to the neighboring cells, and calculate the received power values at a plurality of points within the selected grid;
   identify a grid that includes a handover point for a mobile station based on the received power values at the plurality of points within each of the plurality of grids;
   calculate communication qualities of the neighboring base stations in the grid including the handover point; and
   determine whether or not the grid including the handover point is an area incapable of communication with the neighboring base stations with a predetermined communication quality on the basis of the communication qualities of the neighboring base stations.

2. The area detection apparatus according to claim 1, wherein the processor calculates a communication quality of a base station forming a boundary of the handover for the mobile station, and then calculates communication qualities of the other neighboring base stations.

3. The area detection apparatus according to claim 1, wherein the processor calculates communication qualities of the neighboring base stations in a neighboring grid determined to be an area incapable of the communication, and
determines whether or not the neighboring grid is an area incapable of the communication on the basis of the communication qualities of the neighboring base stations.

4. A method, using a processor, for detecting an area, the method comprising:
   forming, using the processor, a plurality of grids in an area overlapping neighboring cells;
   using the processor, iteratively selecting each of the plurality of grids, acquiring received power values in the selected grid from one or more neighboring base stations corresponding to the neighboring cells, and calculating the received power values at a plurality of points within the selected grid;
   identifying, using the processor, a grid that includes a handover point for a mobile station based on the received power values at the plurality of points within each of the plurality of grids;
   calculating, using the processor, communication qualities of the neighboring base stations in the grid including the handover point; and
   determining, using the processor, whether or not the grid including the handover point is an area incapable of communication with the neighboring base stations with a predetermined communication quality on the basis of the communication qualities of the neighboring base stations.

5. A non-transitory computer-readable recording medium having stored therein a program for causing a computer to perform processing comprising:
   forming a plurality of grids in an area overlapping neighboring cells;
   iteratively selecting each of the plurality of grids, acquiring received power values in the selected grid from one or more neighboring base stations corresponding to the neighboring cells, and calculating the received power values at a plurality of points within the selected grid;
   identifying a grid that includes a handover point for a mobile station based on the received power values at the plurality of points within each of the plurality of grids;
   calculating communication qualities of the neighboring base stations in the grid including the handover point; and
   determining whether or not the grid including the handover point is an area incapable of communication with the neighboring base stations with a predetermined communication quality on the basis of the communication qualities of the neighboring base stations.

* * * * *